(12) United States Patent
Flotats et al.

(10) Patent No.: US 7,146,049 B2
(45) Date of Patent: Dec. 5, 2006

(54) MAKING THE APPARENT SPEED OF ELEMENTS IMAGED AT DIFFERENT SPEEDS APPROXIMATELY THE SAME FOR IMAGE RECOGNITION

(75) Inventors: Carles Flotats, Barcelona (ES); David Claramunt, Barcelona (ES); Jose M Rio Doval, Barcelona (ES); Rodrigo Ruiz, Barcelona (ES); Francesc Subirada, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 756 days.

(21) Appl. No.: 10/375,260

(22) Filed: Feb. 28, 2003

(65) Prior Publication Data

US 2004/0170301 A1 Sep. 2, 2004

(51) Int. Cl.
*G06K 9/36* (2006.01)
*G06K 9/68* (2006.01)

(52) U.S. Cl. ........................................ 382/218; 382/254

(58) Field of Classification Search ................ 382/111, 382/141, 218, 254, 255; 356/398, 429, 430, 356/431
See application file for complete search history.

(56) References Cited

U.S. PATENT DOCUMENTS

| 4,170,419 | A | * | 10/1979 | Van Tyne et al. | 356/431 |
| 5,305,392 | A | * | 4/1994 | Longest, Jr. et al. | 382/8 |
| 5,487,011 | A | * | 1/1996 | Chaiken | 364/470 |
| 6,118,132 | A | * | 9/2000 | Tullis | 250/559.39 |
| 6,195,019 | B1 | * | 2/2001 | Nagura | 340/928 |

\* cited by examiner

*Primary Examiner*—Andrew W. Johns

(57) ABSTRACT

A method for image recognition. In the method, a section of an element is imaged while the element is at a first speed to obtain a first image pattern. The section of the element is also imaged while the element is at a second speed to obtain a second image pattern. The first speed differs from the second speed. In addition, the apparent speeds of the element in the first image pattern and the second image pattern are made to appear approximately the same.

37 Claims, 5 Drawing Sheets

| ΔS (IN/SEC) | COMPRESSION/ EXPANSION (%) |
|---|---|
| .01 | 1 |
| .02 | 2 |
| .03 | 3 |
| .04 | 4 |
| .05 | 5 |
| ⋮ | ⋮ |
| X | Y |

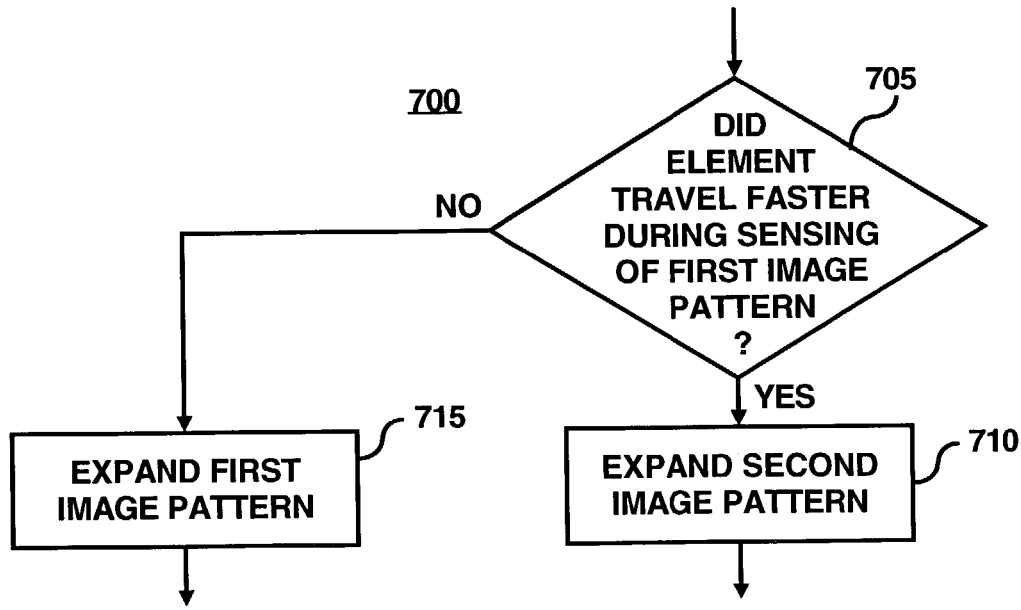
FIG. 7A
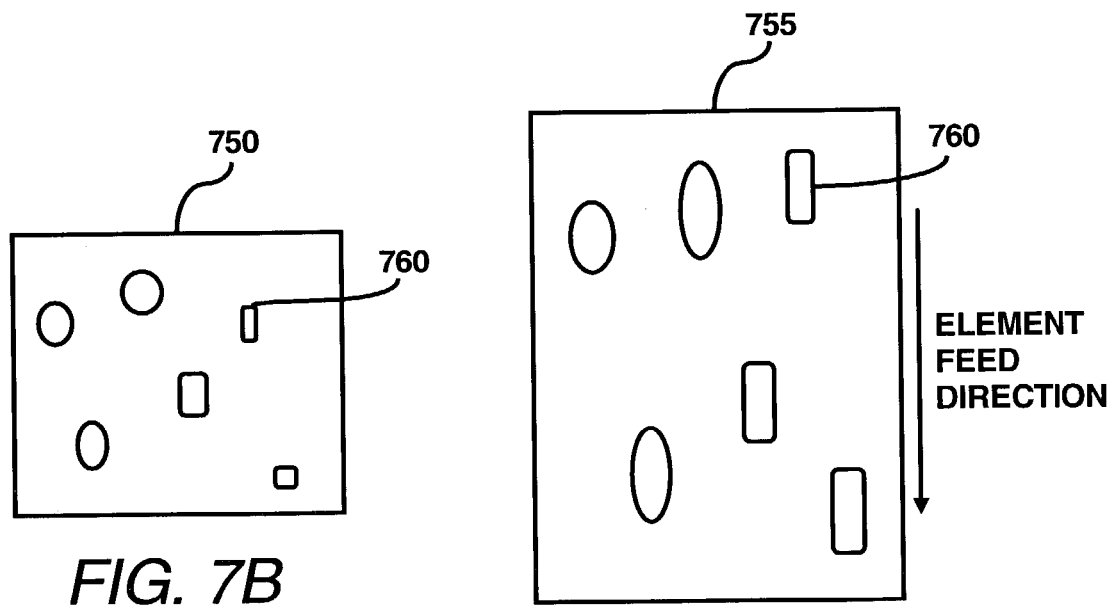
FIG. 7B
FIG. 7C

MAKING THE APPARENT SPEED OF ELEMENTS IMAGED AT DIFFERENT SPEEDS APPROXIMATELY THE SAME FOR IMAGE RECOGNITION

TECHNICAL FIELD

The present invention relates generally to image recognition.

BACKGROUND ART

A plurality of systems are designed to detect movement of an element. Such systems typically utilize the detected movement information to synchronize other operations. By way of example, in an image forming device (e.g., printer, photocopier, facsimile machine, etc.), the detected movement information of media may, be used to synchronize the placement of image forming material onto the media.

The movement of a web of material may be detected through implementation of a pair of photosensors located a distance apart from each other along a feed direction. For instance, FIG. 1 (U.S. Pat. No. 6,118,132) depicts a system containing a pair of photosensors 16 and 18 that are located near the web of material and spaced a distance "d" apart from each other. In this system, a portion of the web of material is photographed by the first photosensor 16, fed a predetermined distance, and photographed by the second photosensor 18. By comparing the locations of the web portions in the respective photographed images, the movement of the web of material is determined.

The system is utilized for calculating velocity, displacement and/or strain of a moving web of material. The photosensors 16 and 18 detect an inherent structure-related property (such as paper fibers, or other constituents) of the web of material at various instances in time. By comparing the detected locations of the inherent structure-related property, the velocity, displacement and/or strain of the moving web of material is calculated.

However, if there is a change in speed of the web of material between the two images (for example, when the web is accelerating or decelerating), one of the images may have a greater level of distortion, e.g., blur or other forms of distortion, as compared to the other image. Thus, it may be difficult for an image recognition algorithm to operate in a relatively efficient manner. One solution is to reduce the time the exposure of a photosensor is open. However, the reduction in exposure time may require a higher amount of illumination in order to ensure that the images are properly illuminated. This increase in illumination may necessitate an associated increase in the cost of the imaging system and may, at a certain point, become impractical.

SUMMARY

According to an embodiment, the invention pertains to a method for image recognition. In the method, a section of an element is imaged while the element is at a first speed to obtain a first image pattern. The section of the element is also imaged while the element is at a second speed to obtain a second image pattern. The first speed differs from the second speed. In addition, the apparent speeds of the element in the first image pattern and the second image pattern are made to appear approximately the same.

BRIEF DESCRIPTION OF THE DRAWINGS

Features and aspects of the present invention will become apparent to those skilled in the art from the following description with reference to the drawings, in which:

FIG. 7A is an exemplary flow diagram depicting a portion of an operation depicted in FIG. 5 according to an embodiment of the invention; and FIGS. 7B and 7C, collectively, illustrate a manner in which an image pattern may be expanded according to an embodiment of the invention.

DETAILED DESCRIPTION

For simplicity and illustrative purposes, the principles of the present invention are described by referring mainly to various embodiments thereof. In the following description, numerous specific details are set forth in order to provide a thorough understanding of the present invention. It will be apparent however, to one of ordinary skill in the art, that the present invention may be practiced without limitation to these specific details. In other instances, well known methods and structure have not been described in detail so as not to unnecessarily obscure the present invention. The terminology used herein is for the purpose of description and not of limitation.

Figure 1:
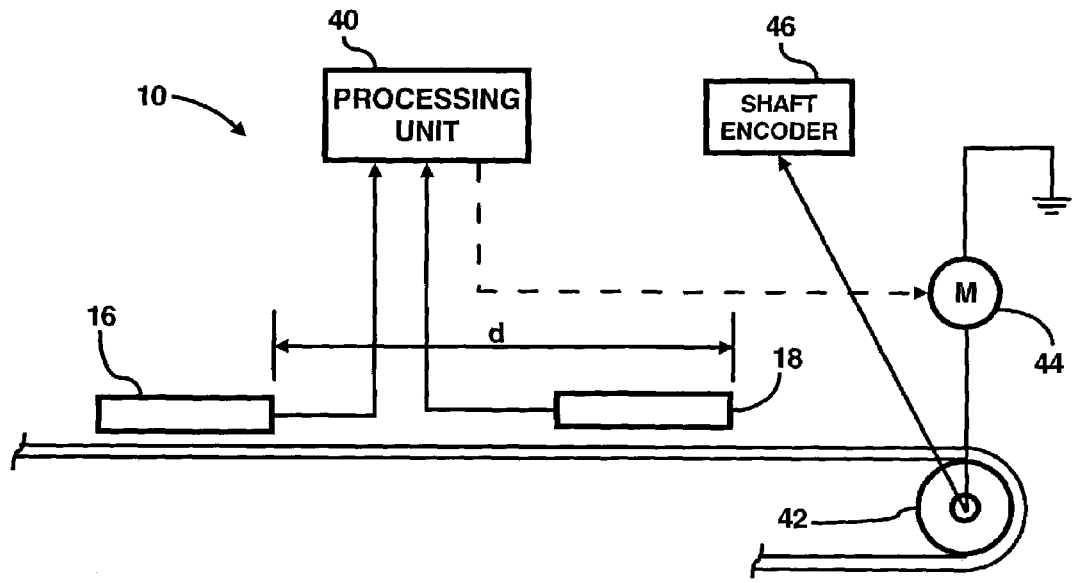
FIG. 1 shows a simplified cross-sectional side view of a conventional photosensor array.
Figure 2:
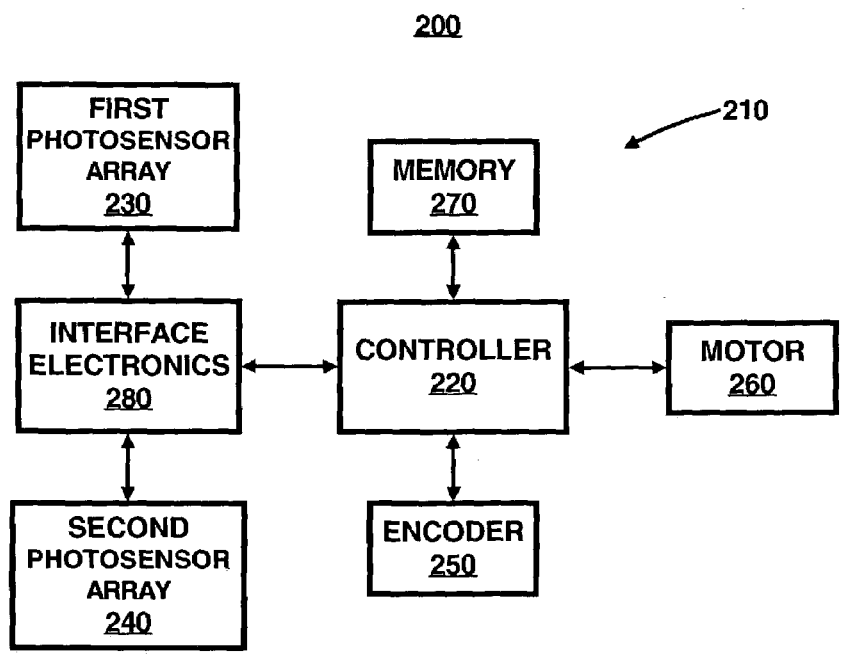
FIG. 2 shows an exemplary block diagram of a control scheme according to an embodiment of the invention.

With reference to FIG. 2, there is illustrated an exemplary block diagram 200 of a photosensing system 210 according to an embodiment of the invention. The following description of the block diagram 200 is a simplified description of the way in which the photosensing system 210 may be operated. In this respect, it is to be understood that the following description of the block diagram 200 is but one manner of a variety of different manners in which the photosensing system 210 may be operated. It should be readily apparent to those of ordinary skill in the art that the photosensing system 210 depicted in FIG. 2 represents a generalized illustration and that other components may be added or existing components may be removed or modified without departing from the scope of the present invention. For example, the photosensing system 210 may include a power supply, illumination devices, cables, and the like.

The photosensing system 210 includes a controller 220, a first photosensor array 230, a second photosensor array 240, an encoder 250 and a motor 260. The controller 220 is configured to control operation of the photosensing system 210. In this regard, the controller 220 may comprise a microprocessor, a micro-controller, an application specific integrated circuit (ASIC), and the like. Although FIG. 2 illustrates two photosensor arrays 230, 240, it should be understood that the number of photosensor arrays is not critical to the operation of this embodiment of the invention. Instead, the photosensing system 210 may include any reasonably suitable number of photosensor arrays, including a single photosensor array.

The controller 220 generally operates the motor 260 to cause rotation of a shaft (not shown). The shaft may, in turn, be arranged to cause translation of an element (not shown). In this respect, the element may be driven in any reasonably suitable manner by the shaft. The encoder 250 may be designed to detect rotational movement of the shaft and provide this information to the controller 220. In addition or in the alternative, the encoder 250 may be designed to detect operation of the motor 260 and provide this information to the controller 220. The controller 220 may determine general positional information of the element based upon the information received from the encoder 250. The positional information may include location, velocity, acceleration, etc.

For sake of simplicity, the terms "element" or "object" are disclosed and described throughout the present disclosure and generally refers to any object that is capable of being motivated passed one or more photosensor arrays. In this respect, the terms "element" or "object" may comprise a web of material supplied in a roll, pre-cut sheets, non-planar objects, ordered and randomly situated objects, and the like. In addition, elements may be composed of, e.g., paper, plastic, fabric, metal, and the like.

In determining the positional information of the element, the controller 220 may access software or algorithms for computing the positional information with respect to data received from the encoder 250. The controller 220 may be interfaced with a memory 270 configured to generally provide storage of a computer software that provides the functionality of the photosensing system 210. The computing software may include these positional information algorithms. The memory 270 may also be configured to provide a storage for containing data/information pertaining to the manner in which the first photosensor array 230 and the second photosensor array 240 may be operated. In addition, the memory 270 may be configured to provide storage of computing software designed to interpret and compare data/information received from the first photosensor array 230 and/or the second photosensor array 240. The memory 270 may be implemented as a combination of volatile and non-volatile memory, such as dynamic random access memory (DRAM), EEPROM, flash memory, and the like.

The memory 270 may also include image recognition algorithms stored as software. The image recognition algorithms may generally enable recognition of images obtained from the first photosensor array 230 and the second photosensor array 240. In one regard, the image recognition algorithms may be configured to determine movement of the element with relatively greater accuracy compared with measurements from the encoder 250.

To facilitate operation of the image recognition algorithms, the controller 220 may be configured to operate the timing of operation of the first photosensor array 230 and the second photosensor array 240. In one respect, the timing may be based upon information received from the encoder 250. That is, the controller 220 may cause the first photosensor array 230 to photograph a portion of the element after the element has traveled a predetermined distance. In the case of a printing device, such as a scanning ink jet printer, the predetermined distance may substantially be equivalent to a swath height, a portion of the swath height, or multiples of the swath height. The controller 220 may also cause the second photosensor array 240 to photograph the portion of the element after the element has traveled a predetermined distance. In the case of a scanning ink jet printer or a full-page array printer, the predetermined distance may substantially be equivalent to the distance between the first photosensor array 230 and the second photosensor array 240. More particularly, the predetermined distance may substantially be equivalent to the distance between the fields of view of the first photosensor array 230 and the second photosensor array 240. In addition, the second photosensor array 240 may be positioned a relatively short distance from the first photosensor array 240 along the element feed direction.

Figures 3, 4:
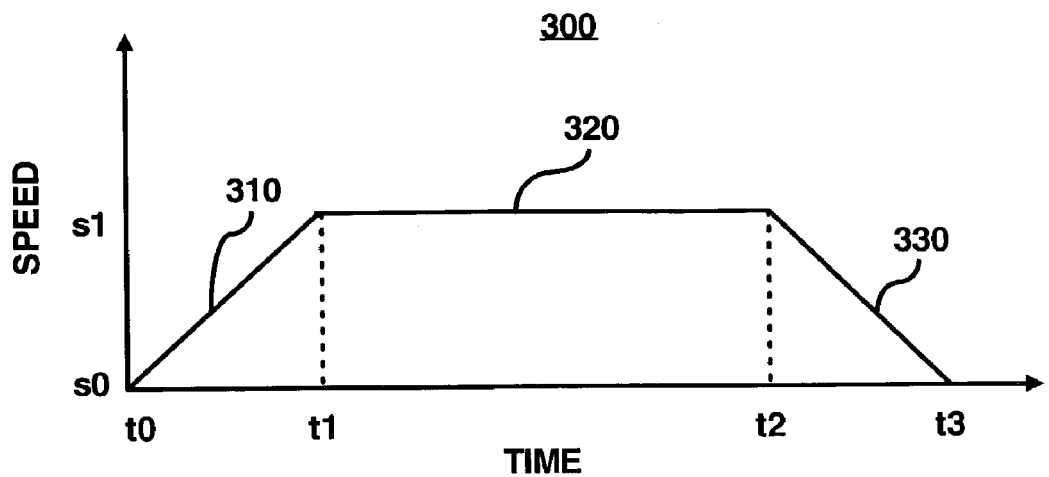
FIG. 3 is a chart depicting the speed versus time of an element fed through a device configured to image the element.
FIG. 4 shows a look-up table that correlates the difference in speed ($\Delta s$) with a percentage of compression or expansion of an image pattern according to an embodiment of the invention.

FIG. 3 is a chart 300 depicting the speed versus time of an element, e.g., media, either in a roll or pre-cut sheets, fed through a device configured to image the element. As shown in FIG. 3, at time zero t0, the speed of the element may also be zero s0. At some point, e.g., prior to receiving imaging material, the element is accelerated as denoted by the diagonal line 310. The element may be accelerated until it reaches a predetermined speed denoted as s1, which may occur at time t1. The element may continue traveling substantially at the predetermined speed s1 until a predetermined amount of time elapses, which is denoted by the horizontal line 320. At time t2, the element may be decelerated as denoted by the diagonal line 330, until it comes to a stop at time t3. Typically, print media in a scanning ink jet printer is advanced between swaths with a velocity profile which generally corresponds to that shown in FIG. 3.

When an image of the element is obtained as the element is moving, the image may be distorted, e.g., blurred. The level of distortion may substantially be related to the velocity of the element. Thus, for example, when an image is obtained as the element is accelerating (line 310) and another image is obtained as the element is traveling at a substantially constant speed (line 320), the levels of distortion between the two images may differ. By virtue of this difference, an image recognition algorithm may have difficulty in comparing the two images. Thus, it may be difficult or impossible to determine the distance the element has advanced between the instances when the two images were taken.

With reference again to FIG. 2, the memory 270 may further include algorithms designed to manipulate one or more of the image patterns obtained by the first photosensor array 230 and the second photosensor array 240 to substantially equalize the levels of distortion among the image patterns. These algorithms may be stored as software in the memory 270 and operate to manipulate the image patterns by compressing or expanding the image patterns. According to an embodiment of the invention, one or more of the image patterns may be expanded or contracted to make the image patterns appear visually similar to one another. Through manipulation of the image patterns, the image recognition algorithm may more accurately recognize inherent structure related properties, marks or other distinguishing features in the image patterns. This recognition may in turn be implemented to more accurately determine movement of the element as compared to reliance upon readings from the encoder 250.

The compression or expansion of the image patterns may be based upon, for example, the element's velocity (predicted or measured) during imaging thereof. By way of example, the image patterns may be manipulated according to the percentage of compression or expansion as a function of speed of the element. As described hereinabove, the level of image pattern manipulation may be based upon the level of manipulation required to make the image patterns look visually similar.

Illustrated in FIG. 4 is an example of a manner in which the speed of the element may relate to the percentage of the compression or expansion applied to an image pattern. In FIG. 4, there is illustrated a look-up table 400 that correlates the difference in speed ($\Delta s$) of the element with a percentage of compression or expansion that is required to make one image pattern look visually similar to the other image pattern. That is, the image pattern obtained when the element was traveling at a slower speed may be expanded in the direction of travel by the corresponding percentage indicated in the look-up table 400. Conversely, the image pattern obtained when the element was traveling at a higher speed may be compressed in the direction of travel by the corresponding percentage indicated in the look-up table 400. In addition, according to another embodiment of the invention, more than one of the image patterns may be manipulated, e.g., compressed or expanded. For example, in this embodiment, the percentage of expansion or compression applied to the image patterns may depend upon the speeds of the element during obtaining of the image patterns. The total level of manipulation of the image patterns may equal the indicated percentage in the look-up table 400.

By way of example and with reference to FIG. 4, when the $\Delta s$ is 0.01 in/sec, the corresponding compression or expansion percentage is 1%. Thus, for example, if the element was traveling 0.01 in/sec faster during imaging of the first image pattern than the second image pattern, the first image pattern may be compressed by 1%. Alternatively, the second image pattern may be expanded by 1%. As a further alternative, both image patterns may be manipulated in a manner as described hereinabove. Under this alternative, for example, the first image pattern may be compressed by 0.6% and the second image pattern may be expanded by 0.4%.

It should be understood that the percentages indicated in the look-up table are for illustrative purposes only and that they are not intended to limit the invention in any respect. Therefore, it should readily be understood that the percentage of compression or expansion may be varied in accordance with a variety of factors. These factors may include, but are not limited to, the image recognition algorithms, the resolution of the photosensor arrays, the lighting available, etc. In addition, the percentage of compression or expansion may be based upon test runs designed to optimize operation of the image recognition algorithms.

According to another embodiment of the invention, the exposure time may be increased for the photosensor array employed to obtain the image pattern when the element is moving relatively slower. The increase in exposure time may give rise to a blurring effect which may be equivalent to the difference in speeds of the element when the image patterns are obtained. The controller 220 may determine the speed of the element by correlating the position of the element with respect to the speed profile (FIG. 3). This information may be obtained from data received from the encoder 250. Thus, for example, the controller 220 may determine that the first image pattern is to be obtained while the element is accelerating (line 310) and the second image pattern is to be obtained while the element is also accelerating (line 310) and traveling at a greater speed. In this case, the controller 220 may increase the exposure time of the first photosensor array 230 during the obtaining of the first image pattern in order that the first image is intentionally blurred to appear similar to the second image. In a situation where the first image pattern is obtained while the element is traveling at a substantially constant velocity (line 320) and the second image pattern is obtained while decelerating (line 330) and thus traveling slower, the controller 220 may increase the aperture time of the second photosensor array 240 during the obtaining of the second image pattern.

The exposure time may correlate in much the same manner as the expansion/compression percentages described with respect to FIG. 4. Thus, for example, the exposure time may be increased by 1% when imaging the element at the slower speed when the difference in speeds ($\Delta s$) of the element is 0.01 in/sec. By virtue of this embodiment, the level of distortion, e.g., blur or other forms of distortion, between the image patterns may substantially be matched to make the image patterns appear visually similar. In addition, by increasing the exposure time, the level of illumination may be reduced, therefore reducing or negating the need for additional illumination.

Referring back to FIG. 2, interface electronics 280 may be provided to act as an interface between the controller 220 and the first and second photosensor arrays 230, 240. The interface electronics 280 may operate the imaging systems of the photosensor arrays 230, 240.

The photosensor arrays 230, 240 may comprise any reasonably suitable components capable of photosensing a portion of an element. In this regard, the photosensor arrays 230, 240 may comprise a plurality of photosensor elements, such as, charge-coupled devices (CCDs), CMOS devices, amorphous silicon devices, and the like. The photosensor arrays 230, 240 may also be configured as a two dimensional array.

Figure 5:
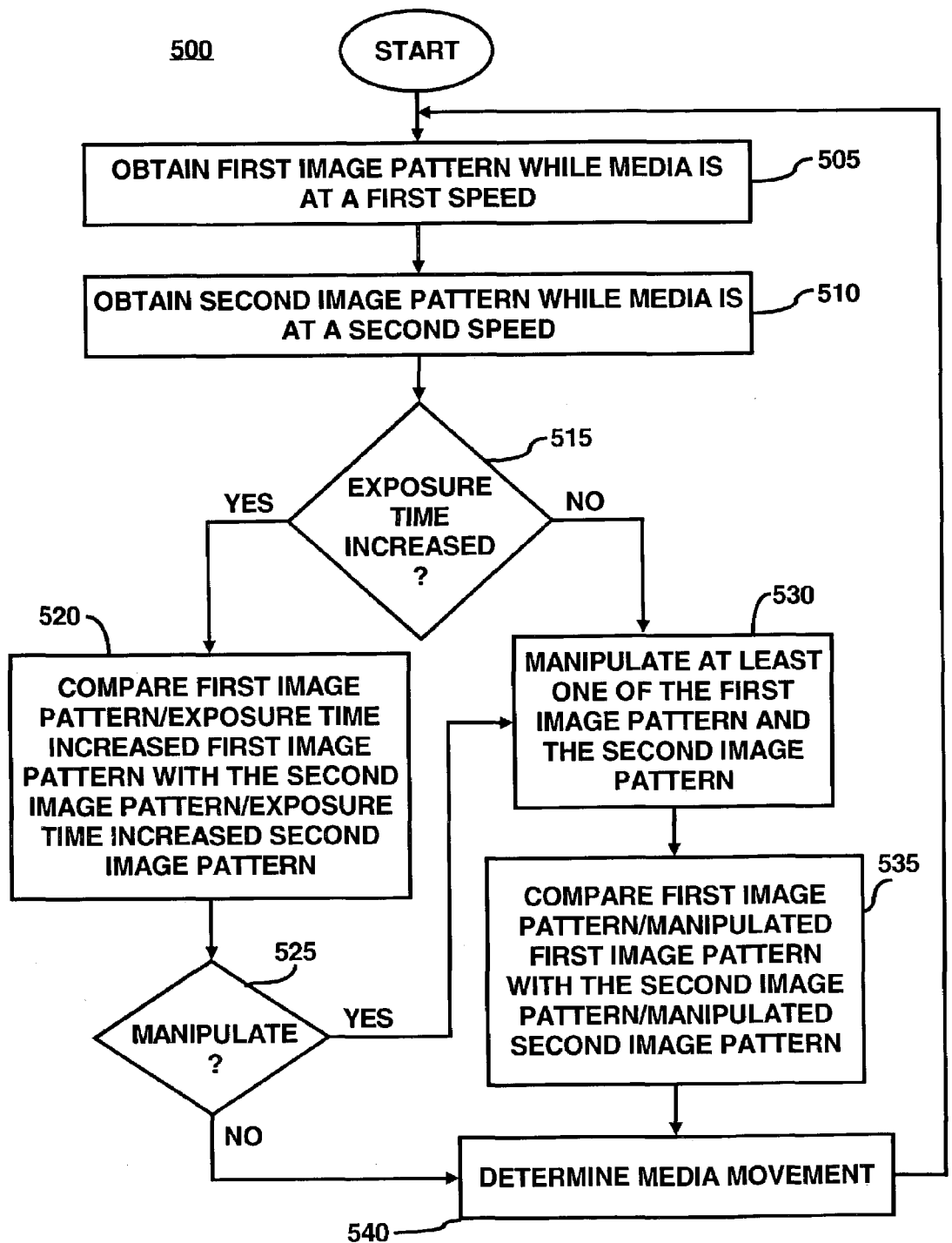
FIG. 5 is an exemplary flow diagram depicting a manner in which an embodiment of the invention may operate.

Referring now to FIG. 5, there is illustrated an exemplary flow diagram 500 depicting a manner in which an embodiment of the invention may be operated. According to this embodiment, a first image pattern is obtained by the first photosensor array 230 while an element is at a first speed at step 505. It should be understood that the first image pattern may be obtained while the element is stationary. In addition, with reference to FIG. 3, the first image pattern may be obtained while the element is accelerating (line 310), traveling at a substantially constant velocity (line 320) or decelerating (line 330).

At step 510, a second image pattern is obtained by the second photosensor array 240 while the element is at a second speed which may differ from the first speed. If the second speed does equal the first speed, then it should be understood that no manipulation of either the first image pattern or the second image pattern is necessary. It is contemplated, for example, that the second speed may be zero if the first speed is not zero. In addition, the element may be accelerating (line 310), traveling at a substantially constant velocity (line 320) or decelerating (line 330) as it passes by the second photosensor array 240. As described hereinabove, the first image pattern and the second image pattern may comprise an inherent structural property of the element (e.g., fibers, openings, or other constituents), a printed image, or other forms of indicia on the element.

At step 515, the controller 220 may determine whether the exposure time during obtaining of at least one of the first image pattern and the second image pattern was increased. As described hereinabove, the exposure time may be increased to increase the distortion, e.g., blur or other form of distortion, of the image pattern to more closely resemble the other image pattern. That is, for example, the exposure time during capture of the image pattern while the element was traveling slower may be increased to make the apparent velocity of the element during capture while moving slower seem similar to the velocity of the element during capture while moving faster. In capturing the image patterns, the controller 220 may determine when to increase the exposure time based upon the location of the element in relation to the speed profile 300. Thus, for example, if the first image pattern is captured while the element is accelerating (line 310) and the second image pattern is captured while the element is traveling at a substantially constant velocity (line 320), the controller 220 may increase the aperture time during capture of the first image pattern.

If the exposure time has not been increased for at least one of the image patterns, at least one of the first image pattern and the second image pattern may be manipulated at step 530. The manners in which the images may be manipulated will be described in greater detail hereinbelow.

At step 535, an image recognition algorithm stored in the memory 270 may compare the first image pattern/manipulated first image pattern with the second image pattern/manipulated second image pattern. By way of example, if the first image pattern was manipulated and the second image pattern remained the same, then the controller 220 may compare the manipulated first image pattern with the second image pattern.

If the exposure time has been increased for at least one of the image patterns, an image recognition algorithm stored in the memory 270 may be implemented to compare the first image pattern/exposure time increased first image pattern with the second image pattern/exposure time increased second image pattern at step 520. For instance, if the exposure time of the first photosensor array 230 has been increased during capture of the first image pattern, the controller 220 may compare the exposure time increased first image pattern with the second image pattern.

According to an embodiment of the invention, the comparison of the image patterns at step 520 may be utilized in determining the element movement at step 540. More particularly, the element advance may be determined with a greater level of accuracy as compared with reliance upon information from the encoder 250. The difference in element advance determinations may be based upon, for example, slippage of the element from the shaft, expansion/contraction of the element, movement of the element, and other factors that may be the cause of errors in the element feed. In addition, the velocity, acceleration and/or stress/strain on the element may also be determined through the comparison of the image patterns.

The more accurate advance of the element, velocity, acceleration, and/or stress/strain on the element as compared with the detected movement by the encoder 250, may be determined through comparison of the locations of the inherent-structure related properties and/or marks in the first and second image patterns. Through implementation of embodiments of the invention, the image recognition algorithm may more efficiently and accurately compare the locations of these properties or marks.

According to another embodiment of the invention, at step 525, the controller 220 may determine whether at least one of the image patterns is to be manipulated. If at least one of the image patterns is to be manipulated, then steps 530–540 may be performed.

Following step 540, steps 505–540 may be repeated for an indefinite period of time. For example, the method 500 may be repeated so long as elements are fed passed the photosensor arrays.

Figure 6A:
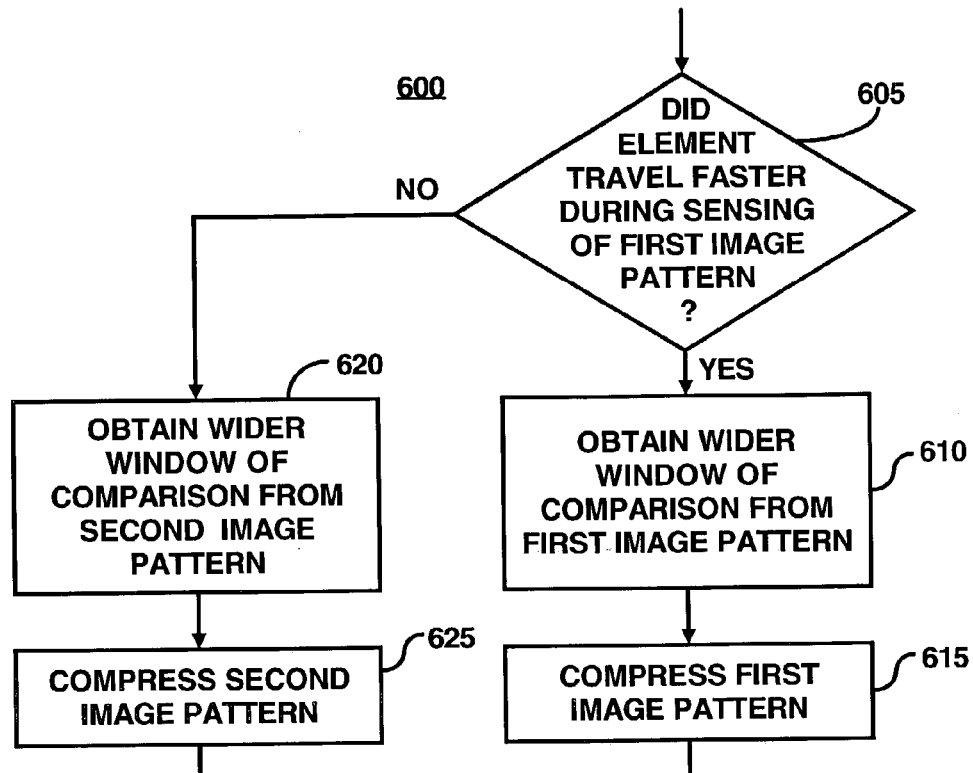
FIG. 6A is an exemplary flow diagram depicting a portion of an operation depicted in FIG. 5 according to an embodiment of the invention.

FIG. 6A is an exemplary flow diagram 600 illustrating a portion of an operation depicted in FIG. 5 according to an embodiment of the invention. More particularly, the flow diagram 600 is a more detailed illustration of the manipulation step 530 in FIG. 5. As part of the manipulation step 530, at step 605, the controller 220 may determine whether the element traveled faster during obtaining the first image pattern or obtaining the second image pattern. This determination may be made before, during or after imaging of the image patterns in any reasonably suitable manner known to those of ordinary skill in the art.

If the element traveled faster when the first image pattern was obtained, a wider window of comparison may be obtained for the first image pattern at step 610. That is, for example, the width of the image captured for the first image pattern (e.g., 655, FIG. 6C) may be relatively wider in an element feed direction than the width of the image captured for the second image pattern (e.g., 650, FIG. 6B). Thus, in obtaining the first image pattern, the exposure width (i.e., the actual frame size of the imaging sensor used) of the first photosensor array 230 may be increased. The wider window of comparison of the first image pattern may be compressed at step 615. In addition, the level of compression may occur in any manner described hereinabove with respect to FIG. 4.

If the element did not travel faster during the acquiring of the first image pattern, i.e., the element traveled faster during the obtaining of the second image pattern, a wider window of comparison may be obtained of the second image pattern at step 620. The wider window of comparison of the second image pattern may be compressed at step 625. Again, the level of compression may occur in any manner described hereinabove with respect to FIG. 4.

Figure 6B:
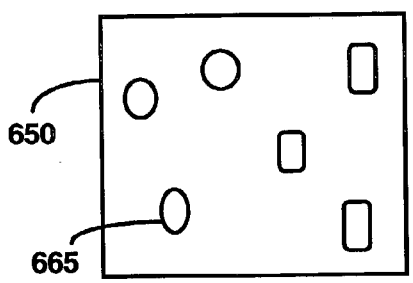
FIGS. 6B–6D, collectively, illustrate a manner in which an image pattern may be compressed according to an embodiment of the invention.
Figure 6C:
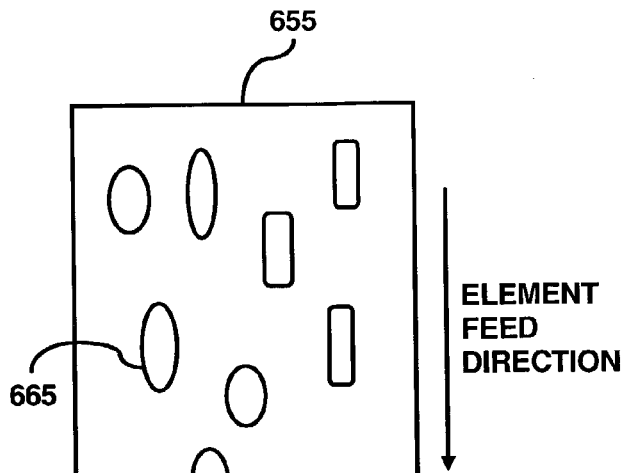
Figure 6D:
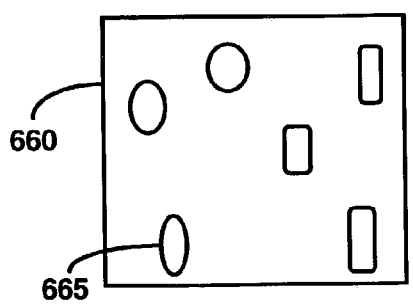

FIGS. 6B–6D, collectively, illustrate a manner in which an image pattern may be compressed according to an embodiment of the invention. The image pattern 650 illustrated in FIG. 6B is representative of an image pattern obtained from the first photosensor array 230. FIG. 6C illustrates an image pattern 655 obtained by the second photosensor array 240 when the element is traveling at a faster speed. In addition, the image pattern 655 is representative of an image pattern in a wider window of comparison along an element feed direction. The image pattern 660 of FIG. 6D is representative of an image pattern resulting from the compression of the image pattern 655 of FIG. 6C, so that it is visually similar to image pattern 650.

For example, if the element traveled faster during capture of the second image pattern, then the second image pattern may appear as the image pattern 655 and the first image pattern may appear as the image pattern 650. The second image pattern 655 may be compressed to have an appearance indicated as image pattern 660 to thus have a more similar appearance to the first image pattern 650.

Illustrated in FIGS. 6B–6D are a plurality of indicia 665. The indicia 665 generally represent inherent structure related properties of the element, e.g., markings, or other forms of indicia, on the element. In comparing the indicia marked 665 in FIGS. 6B and 6C, it can be seen that the indicia 665 appears relatively elongated in FIG. 6C due to the indicia 665 being captured while the element was traveling at a velocity that is faster than when the image pattern was obtained in FIG. 6B. By compressing the image pattern 655 (FIG. 6D), it can be seen that the indicia 665 may also be compressed to more closely resemble that indicia in FIG. 6B. In this regard, an image recognition algorithm may more easily make a positional change determination between the image patterns 650 and 660.

FIG. 7A is an exemplary flow diagram 700 illustrating a portion of an operation depicted in FIG. 5 according to an embodiment of the invention. More particularly, the flow diagram 700 is an illustration of the manipulation step 530 in FIG. 5. As part of the manipulation step 530 (FIG. 5), at step 705, the controller 220 may make a determination of whether the element traveled faster during the obtaining of the first image pattern. Again, this determination may be made before, during or after imaging of the image patterns in any reasonably suitable manner known to those of ordinary skill in the art.

If the element traveled faster when the first image pattern was obtained, the second image pattern may be expanded at step 710. In other words, an artificial distortion, e.g., blur or other form of distortion, may be applied to the second image pattern. In addition, the level of expansion may be applied in any manner described hereinabove with respect to FIG. 4.

If the element did not travel faster during obtaining of the first image pattern, i.e., the element traveled faster during obtaining of the second image pattern, the first image pattern may be expanded at step 715. Again, the level of expansion may occur in any manner described hereinabove with respect to FIG. 4.

FIGS. 7B and 7C, collectively, illustrate a manner in which an image pattern may be expanded according to an embodiment of the invention. The image pattern 750 illustrated in FIG. 7B is representative of an image pattern obtained from, for example, the first photosensor array 230. FIG. 7C illustrates an image pattern 755 that has been expanded from the image pattern 550 in FIG. 7B.

Illustrated in FIGS. 7B and 7C are a plurality of indicia 760. The indicia 760 generally represent inherent structure related properties of the element, e.g., markings or other identifying indicia on the element. In comparing the indicia marked 760 in FIGS. 7B and 7C, it can be seen that the indicia 760 has been elongated in FIG. 7C along an element feed direction. By expanding the image pattern 750 (FIG. 7B), the indicia 760 on image pattern 750 may be expanded to more closely resemble indicia in image pattern 765 that may have been elongated during capture of the image pattern. In this regard, an image recognition algorithm may more easily make a positional change determination between the image patterns 755 and 655.

According to another embodiment of the invention, the first image pattern and the second image pattern may be obtained by a single photosensor array (e.g., the first photosensor array 230 or the second photosensor array 240). In this respect, the photosensor array employed may comprise a relatively wide area sensor. In addition, the photosensor array may be designed to sense a portion of the element at more than one instance in time and at various locations with respect to the photosensor array. For example, with respect to a printing device, e.g., a scanning ink jet printer, the photosensor array may be operable to sense the portion of the element at a first time and sense the portion of the element after it has traveled a swath height, a portion of the swath height, or multiples of the swath height.

Through implementation of the single photosensor array to sense the element at multiple times, the distance between the sensed images may be decreased when compared to systems that utilize multiple photosensor arrays. In one respect, this distance may be smaller due to physical limitations that exist when multiple photosensor arrays are used. By virtue of the smaller distance, when the element undergoes substantially uniform acceleration, any difference in velocity of the element when sensed at the various times may be decreased. This reduction in the velocity differences may result in a reduction in the differences in distortion, e.g., blur or other forms of distortion, between the sensed images.

According to a further embodiment of the invention, the photosensing system 210 may be coupled to a printing mechanism (not shown). In this regard, the photosensing system 210 may comprise part of a system devised to determine movement of element as it is fed through the printer in a manner that is more accurate than reliance on information obtained from an encoder.

By virtue of embodiments of the invention, image recognition algorithms may operate to determine the movement of an element even when there is a difference in speed during imaging of image patterns. In addition, the image recognition algorithms may operate in a relatively efficient manner since the differences in the images being compared have been reduced.

While the invention has been described with reference to certain exemplary embodiments thereof, those skilled in the art may make various modifications to the described embodiments of the invention without departing from the true spirit and scope of the invention. The terms and descriptions used herein are set forth by way of illustration only and not meant as limitations. In particular, although the present invention has been described by examples, a variety of other devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the invention as defined in the following claims and their equivalents.

What is claimed is:

1. A method for image recognition, said method comprising:
    imaging a section of an element while the element is at a first speed to obtain a first image pattern;
    imaging the section of the element while the element is at a second speed to obtain a second image pattern, wherein the first speed differs from the second speed; and
    making the apparent speeds of the element in the first image pattern and the second image pattern appear approximately the same.

2. The method according to claim 1, wherein the step of making the apparent speeds appear approximately the same comprises increasing the distortion of at least one of the first image pattern and the second image pattern.

3. The method according to claim 2, wherein the step of increasing the distortion comprises increasing the exposure time for the image pattern imaged while the element is traveling at a slower velocity relative to the element velocity during imaging of the other image pattern.

4. The method according to claim 2, wherein said distortion increasing step comprises expanding the image pattern for the image pattern imaged while the element was traveling at a slower velocity relative to the element velocity during imaging of the other image pattern.

5. The method according to claim 1, wherein the step of making the apparent speeds appear approximately the same comprises decreasing the distortion of at least one of the first image pattern and the second image pattern.

6. The method according to claim 5, wherein said distortion decreasing step comprises imaging a wider section of the image pattern for the image pattern imaged while the element was traveling at a slower velocity relative to the element velocity during imaging of the other image pattern.

7. The method according to claim 5, wherein said distortion decreasing step comprises compressing the image pattern for the image pattern imaged while the element was traveling at a faster velocity relative to the element velocity during imaging of the other image pattern.

8. The method according to claim 1, wherein said step of making the apparent speeds appear approximately the same comprises decreasing the distortion of the image pattern imaged at the higher element advance speed and increasing the distortion of the image pattern photographed at the lower element advance speed.

9. The method according to claim 1, wherein the step of imaging a section of the element to obtain a first image pattern and imaging the section of the element to obtain a second image pattern comprises obtaining the first image pattern and the second image pattern with one or more photosensor arrays.

10. The method according to claim 1, wherein said step of imaging the section of the element to obtain the first image pattern and the step of imaging the section of the element to obtain the second image pattern includes imaging an indicia on the element.

11. The method according to claim 10, further comprising:
determining positional changes in the locations of indicia on the element between the first image pattern and the second image pattern; and
determining one or more of displacement, velocity, acceleration, and stress/strain of the element based upon the positional changes.

12. A system for image recognition, said system comprising:
at least one photosensor array configured to capture a first image pattern of an element and a second image pattern of the element, wherein the first image pattern and the second image pattern are configured to be captured while the element is traveling at different speeds;
a motor operable to vary the position of the element; and
a controller configured to control operation of the at least one photosensor array and the motor, said controller being configured to make the apparent speeds of the element in the first image pattern and the second image pattern appear approximately the same, and wherein said controller is configured to perform an image recognition operation on the first image pattern and the second image pattern.

13. The system according to claim 12, further comprising an encoder operable to detect information pertaining to advancement of the element, said encoder being configured to send the detected information to the controller, wherein said controller is configured to control operation of the at least one photosensor array in response to the detected information.

14. The system according to claim 12, wherein the controller is further operable to decrease the level of distortion of at least one of the first image pattern and the second image pattern to make the apparent speeds of the element in the first image pattern and the second image pattern appear approximately the same.

15. The system according to claim 14, wherein the controller is further operable to compress the image pattern for the image pattern captured while the element was traveling at a faster velocity relative to the element velocity during imaging of the other image pattern to decrease the level of distortion.

16. The system according to claim 12, wherein the controller is further operable to increase the level of distortion of at least one of the first image pattern and the second image pattern to make the apparent speeds of the element in the first image pattern and the second image pattern appear approximately the same.

17. The system according to claim 16, wherein the controller is operable to expand the image pattern captured while the element was traveling at a slower velocity relative to the element velocity during imaging of the other image pattern to decrease the level of distortion.

18. The system according to claim 16, wherein the controller is operable to increase the exposure time during capture of the image pattern while the element was traveling at a faster velocity relative to the element velocity during imaging of the other image pattern to decrease the level of distortion.

19. The system according to claim 12, wherein the controller is operable to decrease the distortion of the image pattern captured at the higher element advance speed and increase the distortion of the image pattern captured at the lower element advance speed to make the apparent speeds of the element appear approximately the same.

20. The system according to claim 12, wherein the controller is operable to detect indicia on the element in the first image pattern and the second image pattern.

21. The system according to claim 20, wherein the controller is operable to determine positional changes in the locations of indicia on the element between the first image pattern and the second image pattern and determine one or more of displacement, velocity, acceleration, and stress/strain of the element based upon the positional changes.

22. An apparatus for image recognition, said apparatus comprising:
means for capturing a first image pattern and a second image pattern of an element, wherein the first image pattern and the second image pattern are configured to be captured while the element is traveling at different speeds; and
means for making the apparent speeds of the element in the first image pattern and the second image pattern appear approximately the same.

23. The apparatus according to claim 22, wherein the means for making the apparent speeds of the element in the first image pattern and the second image pattern appear approximately the same comprises means for decreasing the level of distortion of at least one of the first image pattern and the second image pattern.

24. The apparatus according to claim 23, wherein means for decreasing the level of distortion of at least one of the first image pattern and the second image pattern comprises means for compressing the image pattern for the image pattern captured while the element was traveling at a faster velocity relative to the element velocity during capture of the other image pattern.

25. The apparatus according to claim 24, wherein means for making the apparent speeds of the element in the first image pattern and the second image pattern appear approximately the same comprises means for increasing the level of distortion of at least one of the first image pattern and the second image pattern.

26. The apparatus according to claim 25, wherein the means for increasing the level of distortion of at least one of the first image pattern and the second image pattern comprises means for expanding the image pattern for the image pattern captured while the element was traveling at a slower velocity relative to the element velocity during imaging of the other image pattern.

27. The apparatus according to claim 25, wherein the means for increasing the level of distortion of at least one of the first image pattern and the second image pattern comprises means for increasing the exposure time for the image pattern captured while the element is traveling at a slower velocity relative to the element velocity during imaging of the other image pattern.

28. The apparatus according to claim 22, wherein the means for making the apparent speeds of the element in the first image pattern and the second image pattern appear approximately the same comprises means for reducing the distortion of the image pattern captured at the higher element advance speed and means for increasing the distortion of the image pattern photographed at the lower element advance speed.

29. The apparatus according to claim 22, further comprising:
  means for determining positional changes in the locations of indicia on the element between the first image pattern and the second image pattern; and
  means for determining one or more of displacement, velocity, acceleration, and stress/strain of the element based upon the positional changes.

30. A computer readable storage medium on which is embedded one or more computer programs, said one or more computer programs implementing a method for image recognition, said one or more computer programs comprising a set of instructions for:
  imaging a section of an element while the element is at a first speed to obtain a first image pattern;
  imaging the section of the element while the element is at a second speed to obtain a second image pattern, wherein the first speed differs from the second speed; and
  making the apparent speeds of the element in the first image pattern and the second image pattern appear approximately the same.

31. The computer readable storage medium according to claim 30, said one or more computer programs further comprising a set of instructions for:
  increasing the distortion of at least one of the first image pattern and the second image pattern.

32. The computer readable storage medium according to claim 31, said one or more computer programs further comprising a set of instructions for:
  increasing the exposure time for the image pattern imaged while the element is traveling at a slower velocity relative to the element velocity during imaging of the other image pattern.

33. The computer readable storage medium according to claim 31, said one or more computer programs further comprising a set of instructions for:
  expanding the image pattern for the image pattern imaged while the element was traveling at a slower velocity relative to the element velocity during imaging of the other image pattern.

34. The computer readable storage medium according to claim 30, said one or more computer programs further comprising a set of instructions for:
  compressing the image pattern for the image pattern imaged while the element was traveling at a faster velocity relative to the element velocity during imaging of the other image pattern.

35. The computer readable storage medium according to claim 30, said one or more computer programs further comprising a set of instructions for:
  decreasing the distortion of the image pattern imaged at the higher element advance speed and increasing the distortion of the image pattern photographed at the lower element advance speed.

36. The computer readable storage medium according to claim 30, said one or more computer programs further comprising a set of instructions for:
  determining positional changes in the locations of indicia on the element between the first image pattern and the second image pattern; and
  determining one or more of displacement, velocity, acceleration, and stress/strain of the element based upon the positional changes.

37. A method of image recognition comprising the steps of:
  generating first and second images of an object at first and second times, said object traveling at different speeds at said first and second times, wherein said first and second images are generated such that the apparent speed of the object in the first and second images are substantially the same.

* * * * *

UNITED STATES PATENT AND TRADEMARK OFFICE
CERTIFICATE OF CORRECTION

| | |
|---|---|
| PATENT NO. | : 7,146,049 B2 |
| APPLICATION NO. | : 10/375260 |
| DATED | : December 5, 2006 |
| INVENTOR(S) | : Carles Flotats et al. |

It is certified that error appears in the above-identified patent and that said Letters Patent is hereby corrected as shown below:

On the title page, item (75), in "Inventors", in column 1, line 2, delete "Barcelona (ES)" and insert -- Sant Esteve Ses Rovires (ES) --, therefor.

Signed and Sealed this

Ninth Day of December, 2008

JON W. DUDAS
*Director of the United States Patent and Trademark Office*